Feb. 2, 1932.   I. R. VERSOY   1,843,908
CORSET
Filed Sept. 7, 1929   2 Sheets-Sheet 1

Inventor
Irving R. Versoy
By Rockwell Bartholow
Attorneys

Feb. 2, 1932.     I. R. VERSOY     1,843,908
CORSET
Filed Sept. 7, 1929    2 Sheets-Sheet 2
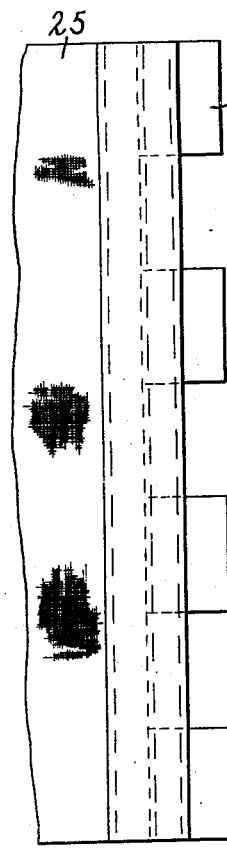
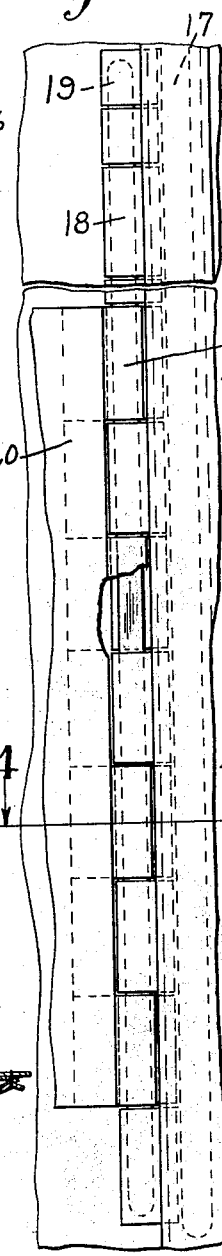
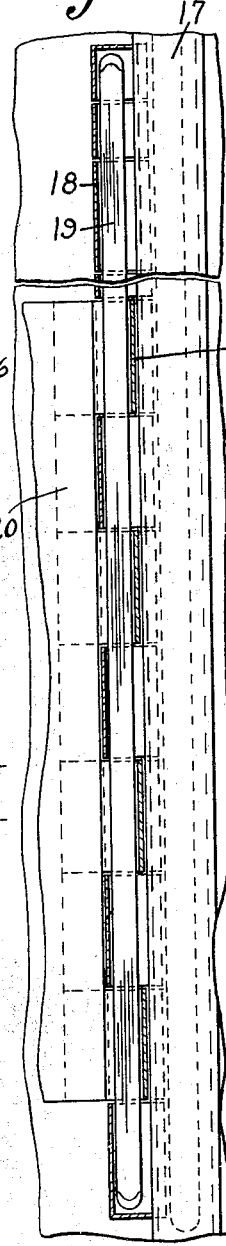
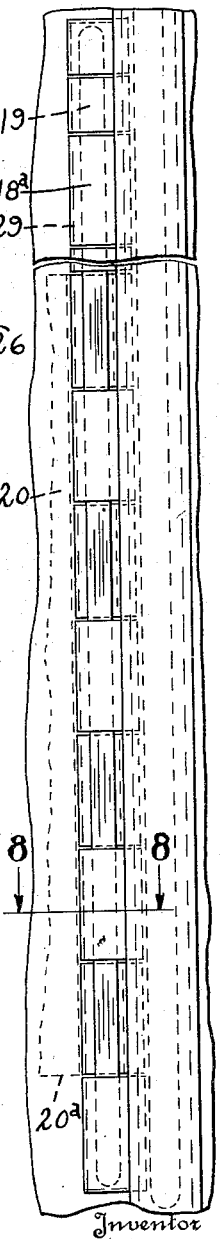
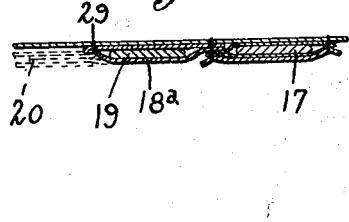
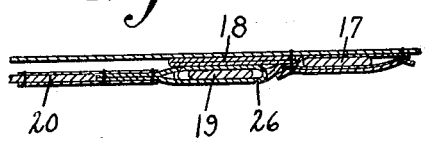

Patented Feb. 2, 1932

1,843,908

UNITED STATES PATENT OFFICE

IRVING R. VERSOY, OF NEW HAVEN, CONNECTICUT, ASSIGNOR TO THE BERGER BROTHERS COMPANY, OF NEW HAVEN, CONNECTICUT

CORSET

Application filed September 7, 1929. Serial No. 391,010.

This invention relates to improvements in corsets and more particularly to a corset which is provided with an abdominal belt or other body supporting means. The improvements which I have made particularly deal with the supporting belt, its means of attachment to the corset body and the structure of the corset portions adjacent the support attaching means.

One object of this invention is to provide an improved corset of the type with which an abdominal belt or other body support may be used.

Another object is to provide a readily removable abdominal belt or other body portion support for a corset or the like.

Another object is to provide an improved body support for a corset in the form of a detachable belt, which may be vertically disposed with respect to the person in a plurality of positions and securely retained therein by being secured to the body portion of a corset.

Still another object is to provide means to secure such a belt or the like to a corset, and which is of such form that the corset will be of neat appearance, convenient for use and simply manipulated.

A further object of this invention is to provide a corset that may be conveniently and efficiently used either with or without a supporting belt or the like.

A still further object of this invention is to provide a corset wherein the corset portion adjacent the belt attaching part will be provided with sufficient stiffening means, whether a belt is secured thereto or not.

A still further object of this invention is to provide an abdominal belt or other body support for a corset, and securing means to connect the same in which the securing means also acts as the stiffening means when the corset is either provided with a belt or not.

To these and other ends, the invention consists in the novel features and combinations of parts to be hereinafter described and claimed.

In the accompanying drawings:

Fig. 3 is an enlarged view of a portion of the corset;

Fig. 4 is a section on line 4—4 of Fig. 3;

Fig. 5 is a longitudinal section through the securing means between the abdominal belt and the corset body;

Fig. 6 is an enlarged fragmentary view of the abdominal belt;

Fig. 7 is an enlarged view of a portion of a corset of slightly modified form, and Fig. 8 is a section on line 8—8 of Fig. 7.

Figure 1:
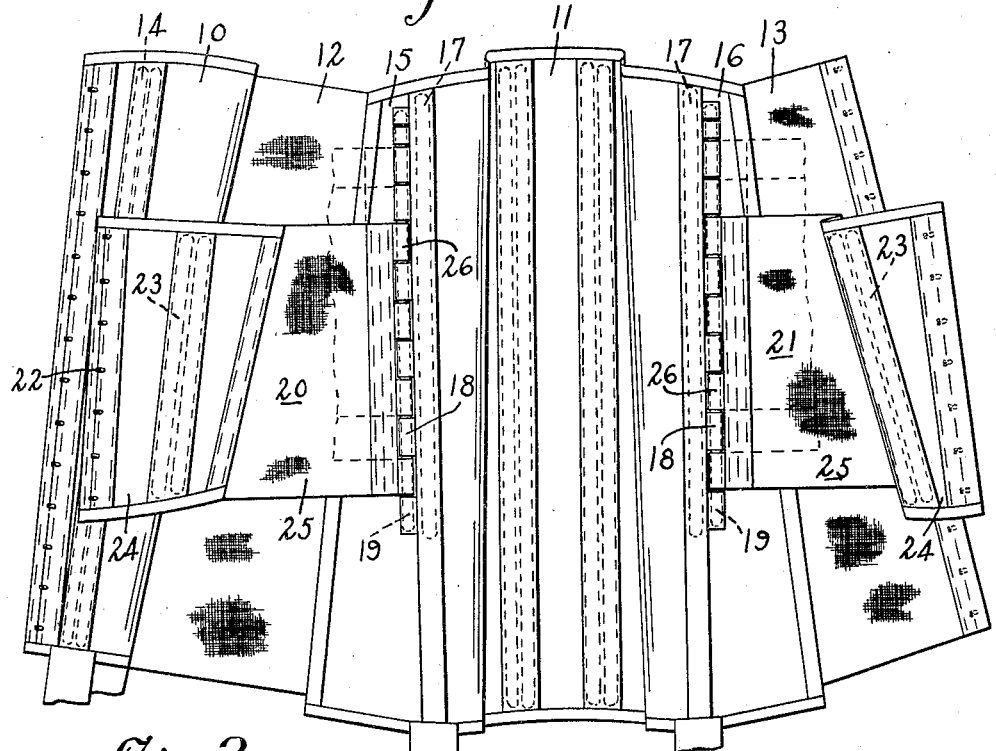
Fig. 1 is an inside plan view of a corset embodying the features of my invention.

The corset selected to illustrate the features of my invention, comprises a front portion 10, and a back portion 11, which are connected by means of elastic webbing sections 12 and 13. This corset is provided with stiffening members or bones 14, that are vertically disposed and arranged in pairs, as many pairs being provided in the front and back portions of the corset as are necessary.

Adjacent each of the sides 15 and 16 of the back portion 11, a single stiffening member or bone 17 is disposed. The member 17 is preferably shorter than the members 14 and does not extend the full length of the corset. The members 14 and 17 are suitably covered with binding material and along the outer edge of the material disposed over the member 17 and secured to the corset body by means of the same stitching that is used to secure this material thereto, is a series of loops 18.

The loops 18 are disposed along the outer edge of this binding material, with the openings therein in vertical alignment. The loops 18 are adapted to have a stiffening member or bone 19 passed downwardly therethrough, the lower loop of each series being closed at its lower end to retain the stiffening member 19 therein, and the upper loop of each series having its upper end closed to form a cap for the upper end of the member 19. When the stiffening member 19 is disposed as above described, it, with the adjacent stiffening member 17, forms a pair of stiffening members that are disposed adjacent each of the side edges 15 and 16 of the corset back portion 11.

The corset illustrated, is provided with an abdominal belt which, in this instance, is in two parts 20 and 21. The belt parts 20 and 21 are adapted to be secured together at the front by means of suitable securing means 22. Each of the belt portions 20 and 21 are provided with a pair of stiffening members or bones 23, disposed in the front section 24 of each. A section of elastic material 25 is secured to each section 24, and along the edge of each of the elastic sections 25 a series of loops 26 are provided.

The loops 26 are disposed with their openings in vertical alignment and are spaced apart an amount substantially equal to the length of one of the loops 18, whereby the loops 26 may be disposed intermediate alternate loops 18 of the series of the same that are secured to the corset body. When the loops 26 are so disposed, the openings therethrough will be in vertical alignment with the openings in the loops 18, and the stiffening member or bone 19 instead of passing through all of the loops 18 may be disposed through the alternate loops 18 and the loops 26. When the member 19 is so disposed, the belt portions 20 and 21 will be secured to the corset body and at the same time the member 19 will act as stiffening means for the adjacent section of the corset body. By disposing the loops 26 of the belt portions 20 and 21 between various alternate loops 18, the vertical disposition of the belt may be varied to suit the requirements of the user.

It will be obvious that the belt, when secured to the body portion of the corset in this manner, will be connected thereto with the necessary freedom of movement and without unduly increasing the thickness of the garment at the point of connection. While the bone which passes through the loops secures the two portions of the corset together in an effective and simple manner, at the same time by the removal of the bone, the belt portions of the corset may be adjusted vertically so that the belt may be placed in any desired position. By arranging a complete series of loops on the body portion of the corset which are closely spaced, a relatively fine adjustment is secured, as a loop 26 may be disposed between any two of the loops 18, the former overlying one of the loops 18 as shown in Fig. 4.

Figure 2:
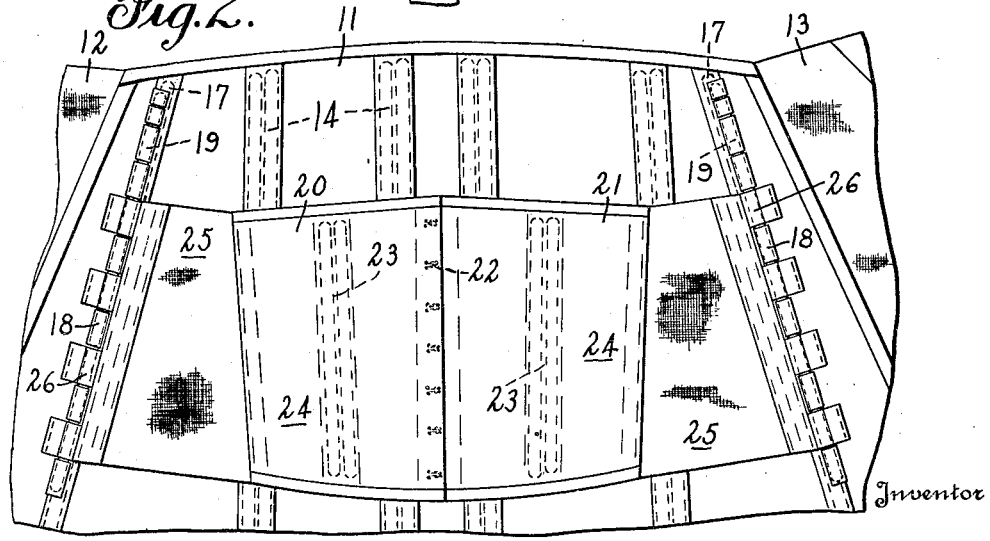
Fig. 2 is a view similar to Fig. 1, showing the corset parts embodying the features of my invention, disposed in another position.

In Figs. 7 and 8 of the drawings I have shown a somewhat modified form wherein the belt portion of the corset 20ª is shown in dotted lines. In this instance, the loops 18ª secured to the body portion of the corset, are stitched thereto as shown at 29, so that these loops will always lie flat upon the body of the corset and have no tendency to curl or roll up when not in use. It will be understood, of course, that when the belt portion of the corset is secured to the body portion thereof, the bone 19 only passes through every alternate loop 18ª, while the remainder of such loops lie below the loops on the belt portion of the corset. In some instances, therefore, it may be found desirable to stitch the loops 18ª to the body of the corset so that they will always lie flatly thereagainst. In other respects the structure shown in Figs. 7 and 8 is like that shown in Figs. 1 to 6.

While the invention is illustrated and described in connection with a corset provided with stiffening bones or stays, it will be understood that it is not limited to this type of garment, but on the other hand, the improved belt securing means may be used with garments which are not provided with such stiffening means.

While I have shown and described some preferred embodiments of my invention, it will be understood that it is not to be limited to all of the details shown, but is capable of modification and variation within the spirit of the invention and within the scope of the appended claims.

What I claim is:

1. A corset comprising a body portion and a belt portion arranged interiorly thereof, said body portion having a series of loops arranged on the inner side thereof, and said belt portion having a series of loops arranged adjacent the end thereof designed to be attached to the body portion of the corset, the loops on one of said portions being spaced apart a distance less than the width of the loops on the other portion.

2. A corset comprising a body portion having a series of laterally extending loops arranged in alignment and in relatively close juxtaposition, said corset also being provided with a belt portion arranged interiorly thereof, said belt portion being provided with a plurality of laterally extending loops having their openings in alignment, said loops being spaced apart a distance substantially equal to the width of one of the loops on the body portion, whereby the loops on the belt portion of the corset are designed to overlie alternate loops on the body portion and to have their openings in alignment with other loops on the body portion, and a bone passed through the aligned openings of the loops.

3. A corset comprising a body portion having a series of laterally extending loops arranged in alignment and in relatively close juxtaposition, said corset also being provided with a belt portion arranged interiorly thereof, said belt portion being provided with a plurality of laterally extending loops having their openings in alignment, said loops being spaced apart a distance substantially equal to the width of one of the loops on the body portion whereby the loops on the belt portion of the corset are designed to overlie alternate loops on the body portion and to have their openings in alignment with other loops on the body portion, and a bone passed through the aligned openings of the loops, and said loops on the body of the corset being stitched thereto at both sides to lie flatly thereagainst.

4. A corset comprising a body portion and a belt portion arranged interiorly thereof, said body portion having a series of loops arranged on the inner side thereof, and said belt portion having a series of loops arranged adjacent the end thereof designed to be attached to the body portion of the corset, all of said loops being substantially of equal width, the loops on one of the portions of the corset being spaced apart a distance substantially equal to the width of the loops, and the loops on the other portion forming a substantially continuous tube interrupted by slits spaced apart a distance equal to the width of the loops, the loops on the first of said portions being arranged to overlie certain of the loops on the other portion and to lie between others thereof with their openings in alignment, and a securing member passed through the aligned openings.

5. A corset comprising a body portion and a belt portion, and means for detachably connecting the belt portion to the body portion comprising a plurality of spaced attaching loops on the belt portion, and loops on the body portion cooperating with said first-named loops for securing the belt to the body in a plurality of spaced positions, the spacing of said positions being less than the spacing of said attaching loops on the belt portion.

6. A corset comprising a body portion and a belt portion, and means for detachably connecting the belt portion to the body portion comprising a plurality of spaced attaching loops on the belt portion, and loops on the body portion cooperating with said first-named loops for securing the belt to the body in a plurality of spaced positions, the spacing of said positions being substantially one-half the spacing of said attaching loops on the belt portion.

In witness whereof, I have hereunto set my hand this 5th day of September, 1929.

IRVING R. VERSOY.